June 6, 1939.  E. W. BETTS  2,161,275

UTILITY SHELF FOR AUTOMOBILES

Filed Sept. 10, 1937  2 Sheets-Sheet 1

Inventor

E. W. Betts

By Clarence A. O'Brien
Hyman Berman

Attorneys

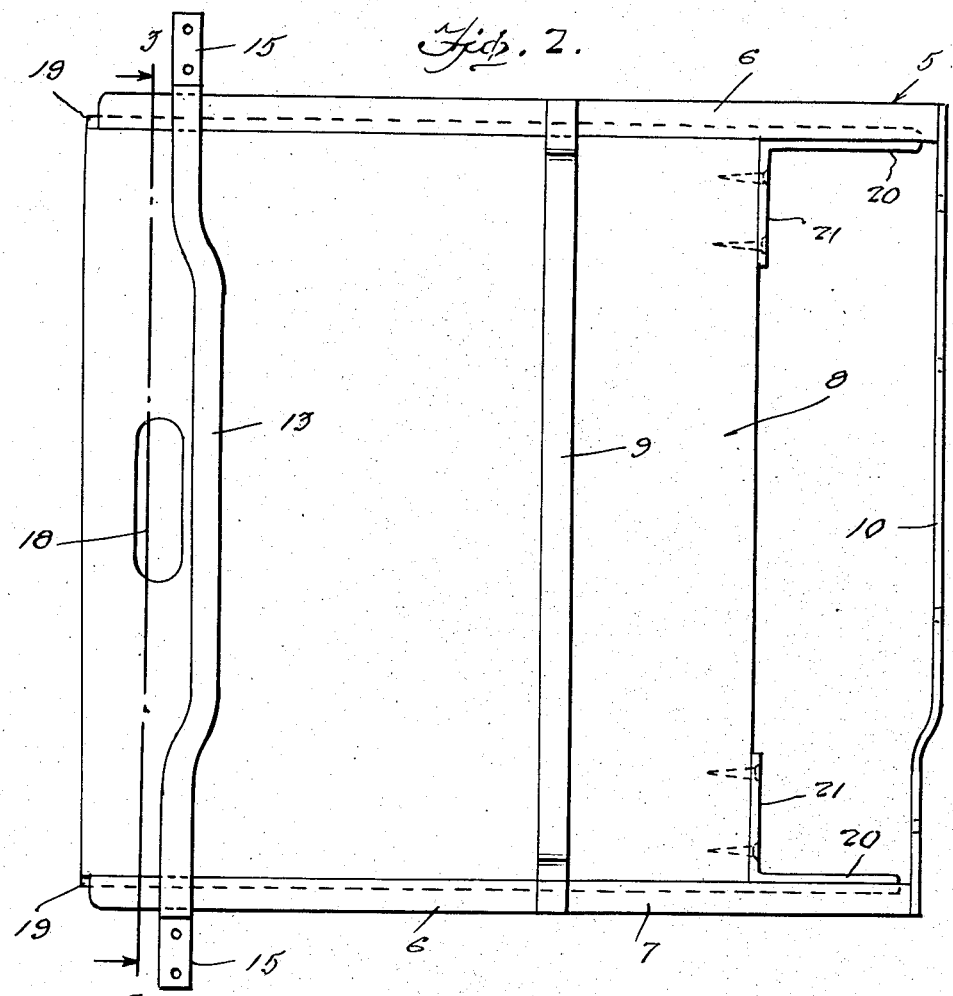
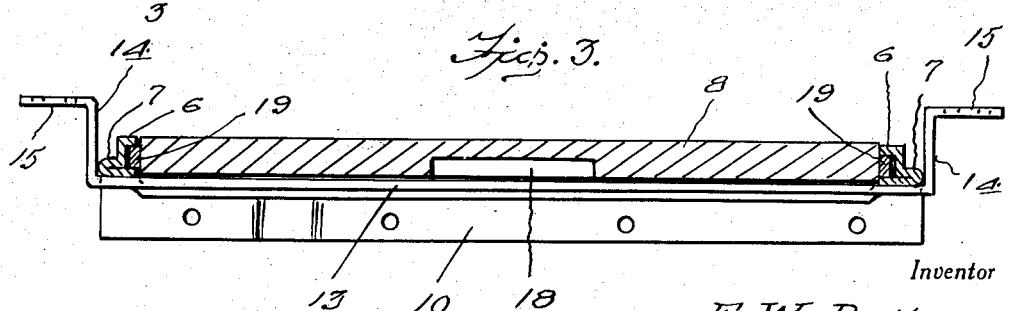

Patented June 6, 1939

2,161,275

UNITED STATES PATENT OFFICE 2,161,275

UTILITY SHELF FOR AUTOMOBILES

Earl W. Betts, Tampa, Fla., assignor of one-fourth to Ruth M. Hosmer and one-fourth to Walton B. Clark, both of Bartow, Fla.

Application September 10, 1937, Serial No. 163,316

3 Claims. (Cl. 311—21)

The present invention relates to a projectible and retractible or receding shelf of a so-called all-purpose type adapted for use in connection with automobiles and similar vehicles or conveyances.

The need for a handy and substantial shelf or miniature table in the fore portion of an automobile is a well recognized trade demand. With this factor in mind, I have evolved and perfected an extensible as well as receding shelf in the nature of a tablette, the same being conveniently associated with the dashboard and instrument board, where its position will be found especially useful to perform the function of a writing desk, an eating table, and general utility shelf.

In reducing to practice the preferred embodiment of the invention, I have found it expedient and practicable to employ a simple supporting frame including guide tracks, said frame being connectible with the dashboard and instrument panel, respectively, whereby to satisfactorily maintain it in position to accommodate the sliding shelf.

Other features and advantages will become more readily apparent from the following description and drawings.

In the drawings:

Figure 2 is a bottom plan view of the structure as a unit perfected in accordance with the principles of this invention.

Figure 3 is a section on the line 3—3 of Figure 2.

Figure 1:
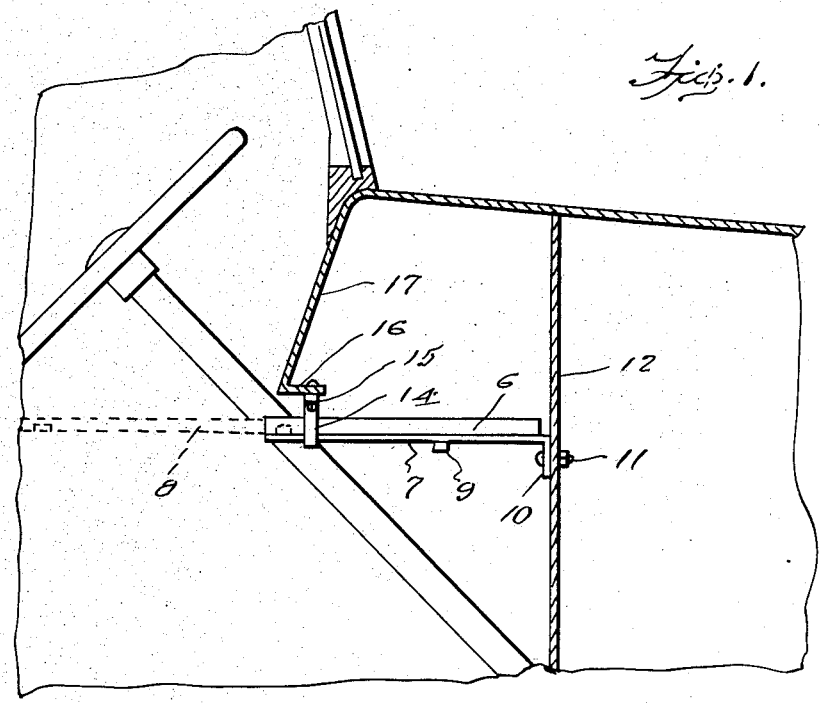
Figure 1 is a view of a fragmentary sectional nature illustrating the automobile dashboard and instrument panel and showing the improved temporarily usable table or shelf in its preferred position.
Figure 4:
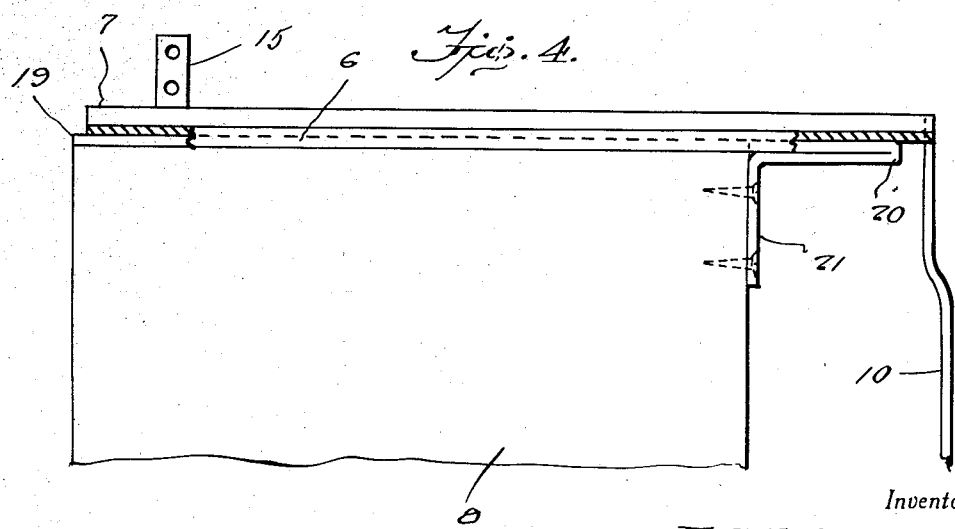
Figure 4 is a fragmentary plan view showing the specific frame and track formation.

Referring now to the drawings by distinguishing reference numerals, it will be observed that the frame unit 5 is preferably of metal and includes a pair of spaced parallel side members 6. As shown in Figure 3, each side member is channel-shaped in cross-sectional form and is fashioned from a strip of metal bent upon itself as at 7 to provide a reinforcing flange. This part 6 functions as an open ended channel-shaped track to accommodate the slidable shelf or table 8. Before describing the latter part, it is to be pointed out that the frame structure also includes a cross-piece 9 at the center which constitutes an effective stabilizing brace. At the forward end the guide tracks are joined together by a depending transverse attaching strap 10. This is of any appropriate formation so as to allow it to be secured by suitable fastenings 11 to the automobile dashboard 12, as seen in Figure 1. Adjacent the opposite ends of the tracks I provide a hanger bar 13, and this is also transversely disposed. Its opposite ends are of L-shaped formation so as to provide suspension members 14 and attaching lugs or ears 15. The parts 15 are preferably secured to the usual edging flange 16 on the instrument panel 17, as shown in Figure 1. Thus, we have a frame structure attached at the spaced points 12 and 17, the same being horizontally disposed and including spaced parallel guide tracks to accommodate the sliding board forming the shelf or table.

The part 8 may be provided in its under side and adjacent its outer end with a recess 18 forming a handhold or finger grip. Then, too, I have found it advisable to provide the longitudinal edge portions of the board with metal runners 19, which are in effect sliding shoes, and they slide directly in the guide tracks. Furthermore, the metal runners 19 are preferably extended beyond the front edge of the shelf where they are formed into return bends 20, and the latter features 20 are provided with lateral terminals 21 fastened to the adjacent edge portion of the board. This provides a stable and obviously rigid shelf unit. Consequently, the frame unit and shelf unit are both effectively designed as component parts of the assembly and they both coact collectively in providing a sturdy and reliable tablette.

It is obvious that the shelf per se may be of wood, metal, or some composition material, such as will permit it to match the general style or finish of the instrument panel. Furthermore, the attaching fixtures which may be regarded as parts 10 and 13, may obviously be varied so that they are more in effect special adapters or hangers to accommodate the particular car on which the frame structure is horizontally mounted.

It is doubtless the consensus of opinion that a projectible and retractible shelf when properly made and positioned becomes a handy accessory for employment in an automobile. Its presence is unnoticed under normal circumstances, since it is positioned under the cowl and between the instrument panel and dashboard. Even when in this position it may be employed to support certain articles. Normally, however, its preferred use is when it is projected to the dotted line position seen in Figure 1, when it may be used as a desk, table, or convenient support for miscellaneous purposes and articles.

While the preferred embodiment of the invention has been shown and described, it is to be understood that minor changes coming within the field of invention claimed may be resorted to if desired.

I claim:

1. An attachment of the class described comprising a frame including a forward attaching plate, rear attaching bar and spaced parallel side members, said side members being channel-shaped in cross-sectional form and constituting guide tracks having flanges formed thereon, a plate at the corresponding ends of said tracks to secure them to a dashboard or fixed support, a bar at the opposite ends of said guide tracks to secure them to a further relatively stationary support, a shelf slidable in said guide tracks, said shelf being provided on opposite longitudinal edges with metal runners forming wear members, and said runners being bent upon themselves and attached to the forward edge of the shelf for reinforcing purposes.

2. In a utility table construction for automobiles, a horizontally disposable supporting frame including a pair of spaced parallel side members, said side members being channel-shaped in cross-sectional design and including integral reinforcing flanges and function as guide tracks, a connecting strip between the forward ends of said tracks, said strip being apertured to accommodate attaching bolts disposed at right angles to the guide tracks, a central cross-member secured to the intermediate portions of the guide tracks, an additional cross-member secured to the remaining end portions of the guide tracks and including upwardly directed L-shaped extensions, said L-shaped extensions including laterally extending hanger brackets and being adapted for connection with the lower edge portion of an instrument panel, and a shelf slidable in said guide tracks.

3. In a construction of the class described, a supporting frame including guide tracks and a shelf associated therewith, said shelf comprising a rectangular member, longitudinal metal runners secured to edge portions of said member, and extending the full length thereof, the runners extending beyond the front end of the member, formed into return bends and having laterally inturned and oppositely disposed extensions fastened to the front edge of the member, as described.

EARL W. BETTS.